(12) United States Patent
Hoff (10) Patent No.: US 7,131,676 B2
(45) Date of Patent: Nov. 7, 2006

(54) LOGGING DEVICE FOR PERFORMING MULTIPLE LOGGING FUNCTIONS

(76) Inventor: Thomas Hoff, 59 Camp Rd., Red Hook, NY (US) 12571

( * ) Notice: Subject to any disclaimer, the term of this patent is extended or adjusted under 35 U.S.C. 154(b) by 0 days.

(21) Appl. No.: 10/972,117

(22) Filed: Oct. 25, 2004

(65) Prior Publication Data

US 2006/0087134 A1    Apr. 27, 2006

(51) Int. Cl.
*B65G 7/12* (2006.01)
*B66F 7/22* (2006.01)

(52) U.S. Cl. .......................................... 294/17; 294/104

(58) Field of Classification Search ................ 294/11, 294/16, 17, 104; 254/94, 131
See application file for complete search history.

(56) References Cited

U.S. PATENT DOCUMENTS

| 240,505 A | * | 4/1881 | Cantrell ................ 294/17 |
| 913,619 A | * | 2/1909 | Church ................ 294/11 |
| 2,435,549 A | * | 2/1948 | Sumter ................ 294/104 |
| 4,087,077 A | * | 5/1978 | Vance ................ 294/17 |
| 4,368,874 A | | 1/1983 | Weisgerber |
| 4,433,829 A | * | 2/1984 | Grover et al. ................ 294/17 |
| 4,533,117 A | * | 8/1985 | Schwang ................ 254/94 |
| 4,637,769 A | * | 1/1987 | Thorndike ................ 294/104 |
| 5,472,180 A | | 12/1995 | Bent |
| 6,676,111 B1 | * | 1/2004 | Bigham ................ 294/17 |

* cited by examiner

*Primary Examiner*—Eileen D. Lillis
*Assistant Examiner*—Paul T Chin (57) ABSTRACT

A multi-function logging machine is disclosed. The machine uses several simple components in various configurations to perform the functions of lifting, rolling, winching and holding a log, which can vary in size, in the field. The Logging Device replaces several devices that now must all be transported to the logging field with one easily transported unit. A body is provided in two feet. A handle fits through openings in the feet and is prevented from withdrawal and turning until released. A support member is mounted at one end of the body. An arm is mounted to rotate in the body. A claw with teeth is mounted on the arm. A cleat is mounted on the body opposite from the support member frame for preventing backward movement on a rope when the Logging Device is used as a winch.

13 Claims, 7 Drawing Sheets

LOGGING DEVICE FOR PERFORMING MULTIPLE LOGGING FUNCTIONS

BACKGROUND OF THE INVENTION

1. Field of Invention

The invention relates to devices for logging and, more specifically, for performing multiple functions including lifting, rolling, pulling and holding logs and timber.

2. Description of Related Art

Logging devices are known in the art. Log lifters, log holders, log pullers and log rollers have existed in various embodiments for many years. They have always, however, been single-purpose devices.

Weisgerber (U.S. Pat. No. 4,368,874) teaches a log lifter comprising a rearwardly sloping, elongated handle that is fastened to a unitary, flat metal base plate having a forward log engaging blade portion extending from a horizontally disposed sole portion and a rearward heel portion joined to the sole portion by means of a curved intermediate section. The blade portion is urged under a log for rocking the same rearwardly over the curved section of the base plate, thus rolling the log.

Bent (U.S. Pat. No. 5,472,180) teaches an apparatus for holding firewood and dimension lumber during cutting that includes an upright member having a generally triangularly shaped plate attached near one end thereof, the plate includes a plurality of steps, each of the plurality of steps having a generally V-shaped portion facing downwards that is attached thereto. The V-shaped portions engage the butt end of any diameter of a log of sufficient size that is placed on the holder and prevents the butt end from becoming dislodged.

A separate plate is attached under the triangularly-shaped plate that is useful for securing the butt end of small logs and of dimension lumber.

A cleat end of a longitudinal member is attached to the upright member under the serrated plate and extends away from the upright member and is generally perpendicular with respect thereto.

A generally rectangular plate having a trough at the top is attached at a support end of the longitudinal member and is useful for the cantilevered placement of logs for cutting thereon. A second longitudinal member is provided at a support end of the upright member that is adapted for placing the holder upon the ground surface during use.

Log manipulation devices, which are intended to handle large logs, are generally heavy and cumbersome to carry. This problem is exacerbated by the need to carry several heavy, cumbersome pieces of equipment, including at least one log lifter, log holder, log roller, and winch. These devices have traditionally been single-function devices and each is cumbersome and necessary for logging. Therefore, it has been necessary to transport and manipulate several individual pieces of single-function equipment. The art is therefore lacking, but feels the need for, a device that combines several logging functions into one transportable unit.

Objects

It is an object of the present invention to provide a Logging Device that is a combination log roller, log lifter, log puller and log holder.

It is another object of the present invention to provide a combination Logging Device that is comparatively easy to transport.

It is another object of the present invention to provide a combination Logging Device that is dependable, durable and comparatively economical.

SUMMARY OF THE INVENTION

A Logging Device is provided to perform multiple logging functions. A body includes a cleat end and a support end. A support member is secured to the body at the support end. A cleat foot is mounted on the body at the cleat end and a support foot is mounted on the body at the support end.

The cleat foot and the support foot are mounted on the same side of the body which is the opposite side from the support member. An arm is mounted on the body on the side opposite from the cleat foot and the support foot. member. A claw is mounted on the arm remote from the body. The cleat foot has a cleat foot opening and the support foot has a support foot opening. A handle engages the cleat foot opening and the support foot opening.

| NUMERAL | DESCRIPTION |
|---|---|
| 11 | BODY |
| 13 | CLEAT END |
| 15 | SUPPORT END |
| 17 | CENTER SECTION |
| 19 | UPPER SURFACE |
| 21 | TWO SIDE SURFACES |
| 23 | TWO LOWER EDGES |
| 25 | NOTCHES |
| 27 | CLEAT |
| 29 | SUPPORT MEMBER |
| 30 | TOP MEMBER |
| 31 | SUPPORT FLANGES |
| 32 | SIDE MEMBERS |
| 33 | SUPPORT FLANGE END |

-continued

| NUMERAL | DESCRIPTION |
| --- | --- |
| 35 | SUPPORT FLANGE OPENINGS |
| 37 | BOLT |
| 39 | SUPPORT FOOT |
| 41 | PIN |
| 43 | OPENING |
| 45 | TWO FEET |
| 47 | FOOT OPENING |
| 49 | CLEAT FOOT |
| 51 | BOLT |
| 53 | OPENING |
| 55 | HANDLE |
| 57 | SUPPORT FOOT OPENING |
| 59 | RAISED BAR |
| 61 | REINFORCED MEMBER |
| 63 | ARM |
| 65 | TOP ELEMENT |
| 67 | TWO SIDE ELEMENT |
| 69 | ARM ELEMENT OF OPENINGS |
| 71 | ARM FLANGES |
| 73 | ARM FLANGE END |
| 76 | ARM FLANGE OPENING |
| 77 | V-NOTCH |
| 78 | NOTCH END |
| 81 | CLAW |
| 83 | TWO SETS OF TEETH |
| 85 | GRIP END |
| 87 | TOP PLATE |
| 89 | TWO SIDE PLATES |
| 91 | EXTENSIONS |
| 93 | STABILIZING MEMBER |
| 95 | CLAW FLANGE END |
| 97 | CLAW FLANGES |
| 99 | CLAW OPENING |
| 101 | PIN |
| 107 | HAND END |
| 109 | LOCK END |
| 111 | CENTRAL PORTION |
| 113 | CUT OUTS |
| 115 | PUSH PIN |
| 116 | RING GUIDE |
| 117 | RAISED SIDES |
| 119 | ROPE |
| 121 | SCREW |
| 123 | CHAIN |
| 125 | PIN |
| 127 | FULCRUM PIN |
| 129 | END PIN |
| 130 | TREE TRUNK |

DESCRIPTION OF THE PREFERRED EMBODIMENT

Figure 1:
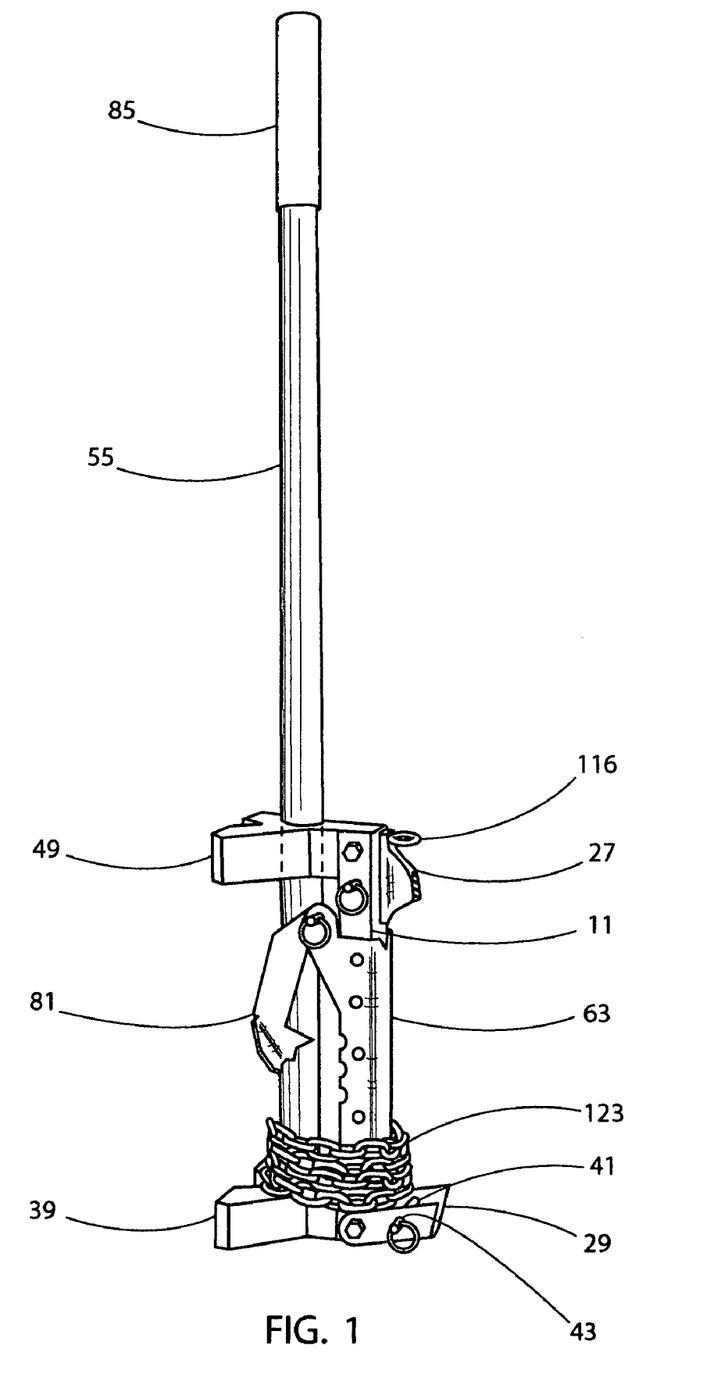
FIG. 1 is a perspective view of the Logging Device assembled for transporting.

In FIG. 1 the Logging Device is shown in its assembled configuration for transport. In FIG. 2a through 2f, the various parts of the Logging Device are shown. A body 11 has a cleat end 13, a support end 15, and a central section 17. The body 11, in general, has the cross section of an inverted U. The body 11 has an upper surface 19 and two side surfaces 21 each with a lower edge 23. Notches 25 are located along the two lower edges 23. Seven notches 25 are shown but any reasonable number of notches 25 can be utilized. At the cleat end 13 of the body 11 there is a cleat or jam cleat 27. The notches 25 are located on the lower edges 23 toward the cleat end 13 and extend more than half the length of the body 11 toward the support end 15. Two pairs of body openings 28 are located through the side surfaces 21 in the central section 17 of the body 11.

A support member 29 is located at the support end 15 of the body 11, which is the opposite end from the cleat end 13. The support member 29 is comparatively short and also has an inverted U shaped cross section. The support member 29 has a top member 30. The support member 29 has a pair of support flanges 31 at one end, namely at a support flange end 33. The pair of support flanges 31 extend from a pair of side members 32. At the support flange end 33 of the support member 29 the support flanges 31 have support flange openings 35 through them. By means of these supports flange openings 35, the support member 29 is secured to the body 11 by means of a bolt 37 that is the same bolt 37 that holds a support foot 39 onto the body 11 at the support end 15 of the body 11. A pin 41 is generally maintained in the support member 29 within an opening 43 in the support member 29 adjacent to the support flanges 31. The pin 41 is essential to the operation of the Logging Device when used as a winch and is also essential when the Logging Device is used as a log roller and a log holder.

Two feet 45 (FIG. 2e) are attached to the opposite ends of the body 11 at the support end 15 and the other foot, the cleat foot 49, is attached to the body 11 at the cleat end 13. The bolt 37 holds the support foot 39 on the body 11 and a bolt 51 holds the cleat foot 49 on the body 11. The cleat foot 49 has a cleat foot opening 53 through it to receive a handle 55. The handle 55 slides easily but securely within the cleat foot 49. The support foot 39 has a support foot opening 57 which is the same size and shape as the cleat foot opening 53 in the cleat foot 49. However, the support foot opening 57 in the support foot 39 does not extend all the way through the support foot 39 but rather is a blind opening extending approximately half way into the support foot 39. The cleat foot opening 53 and the support foot opening 57 are the foot openings 47. Across the bottom of the support foot opening 57 in the support foot 39 there is a raised bar 59 diametrically located across the bottom of the support foot opening 57 in the support foot 39.

Figure 2A:
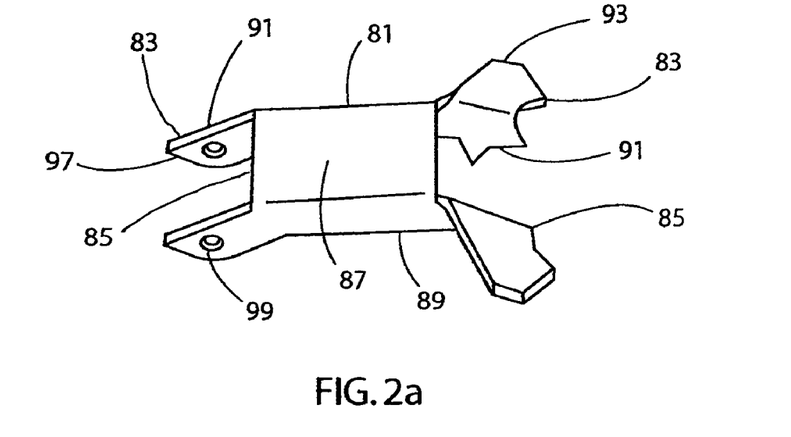
FIG. 2a is a perspective of a claw.
Figure 2B:
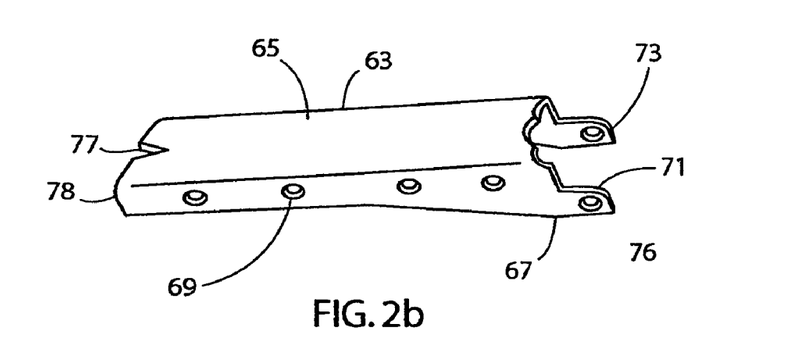
FIG. 2b is a perspective view of an arm.
Figure 2C:
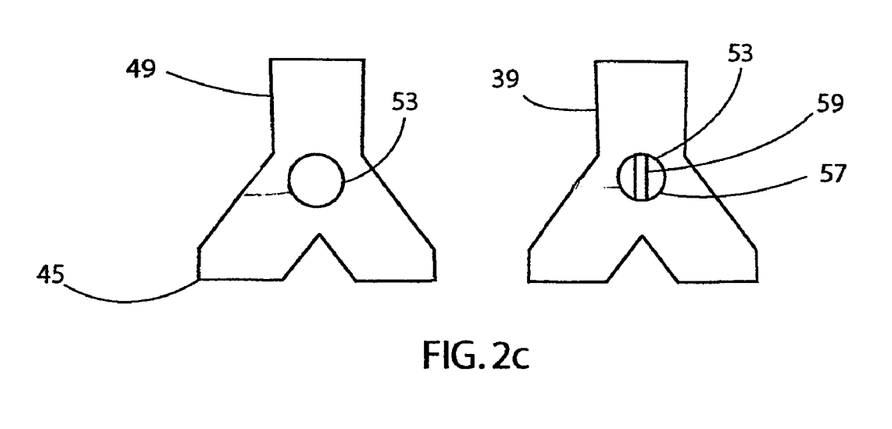
FIG. 2c is a side elevation of a pair of feet used on the body.
Figure 2D:
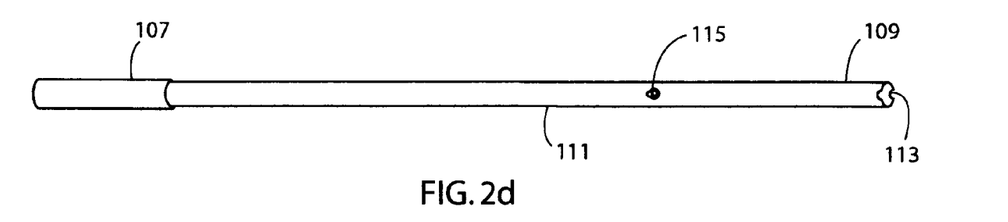
FIG. 2d is a perspective view of a handle.
Figure 2E:
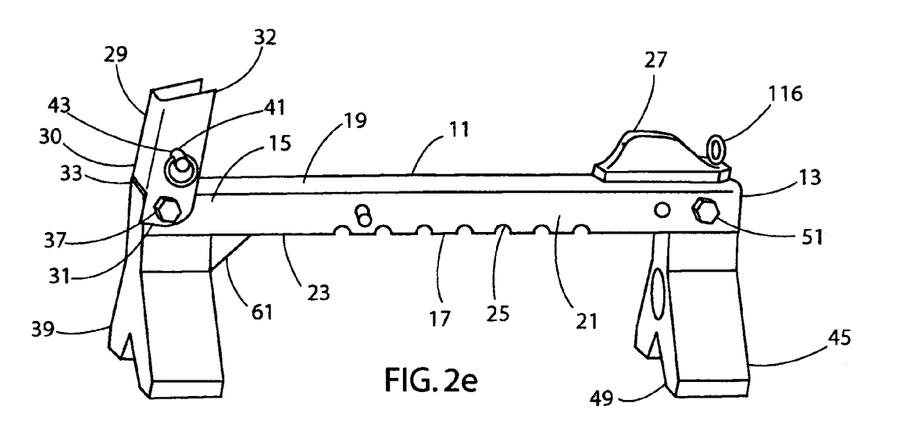
FIG. 2e is a perspective view of the body with both feet attached at the appropriate ends and a cleat attached at one end and a support member attached at the opposite end.

As best seen in FIG. 2e, at the support end 15, the body 11 has, on each of the side surfaces 21, a reinforcement member 61, which is shown having a triangular shape, extending downwardly from the side surfaces 21 of the body 11 and engaging the support foot 39. The reinforcement member 61 prevent possible rotational movement of the support foot 39 at the support end 15.

In FIG. 2b an arm 63 is shown. The arm 63, like the body 11 and the support member 29, has the cross section of an inverted U. The arm 63 has a top element 65 and two side elements 67. Along the side elements 67 there are a plurality of element openings 69. The arm 63 is attached to the body 11 with the arm flanges 71, located at the flange end 73 of the arm 63. The arm flange 71 has an arm flange opening 76. At the opposite end of the arm 63 from the arm flanges 71, there is a V-notch 77 in the top element 65 generally midway between the two side elements 67. The purpose of the V-notch 77 is to grasp a rope when the Logging Device is used as a winch.

A claw 81 (FIG. 2a) is used for gripping a log as shown in FIGS. 3a, 3b, 4a, 4b, and 6. The claw 81 has two sets of teeth 83 at a grip end 85. The claw 81, like the arm 63 and the body 11, has a cross section of an inverted U. The claw 81 has a top plate 87 and two side plates 89. At the grip end 85, the teeth 83 are located on extensions 91 of the two side plates 89. To provide stability when the Logging Device is used as a log holder, each extension 91 includes a stabilizing member 93 which is bent at right angles to it's respective extension 91. The stabilizing members 93 are bent away from one another (FIG. 2a).

At the opposite end from the grip end 85, namely the claw flange end 95, two claw flanges 97 extend from the side plates 89 beyond the top plate 87. The claw 81 can be attached to another component, usually the arm 63, using the claw flanges 97 located at the end of the claw 81 from the teeth 83. Each claw flange 97 has an opening 99 generally in the center of each claw flange 97, through which a pin 101 can be inserted to attach the claw 81 to the notch end 78 of the arm 63, by using a pair of the openings 69 in the arm 63.

The handle is shown in FIG. 2d. The handle 55 has a hand end 107 and at the end opposite from the hand end 107, a lock end 109. A central portion 111 of the handle 55 is located between the hand grip end 107 and the lock end 109. The handle 55 preferably has a circular cross section. The handle 55 fits through the cleat foot opening 53 in the cleat foot 49. The lock end 109 of the handle 55 has a pair of cut outs 113 which are round and aligned with one another and which fit over the raised bar 59 in the bottom of the support foot opening 57 in the support foot.

The handle 55, is made from a material that withstands pressure from use with heavy logs, such as a metal, a hard wood or a plastic or fiberglass. Located toward but spaced from the lock end 109 of the handle 55 there is a push pin 115 which is spring loaded. When inserting the handle into the cleat foot 49, the push pin 115 is depressed to permit the handle 55 to access the cleat foot opening 53 in the cleat foot 49, the push pin 115 is released and is then situated just inside the cleat foot 49. The cut outs 113 in the handle 55 engage the raised bar 59 in the bottom of the foot opening 47 in the support foot 39. This prevents rotation of the handle 55. In this way, the assembled Logging Device can be lifted by the handle 55 and can be used in the various applications discussed hereinafter, without the handle 55 being either inadvertently withdrawn or being turned.

Figure 2F:
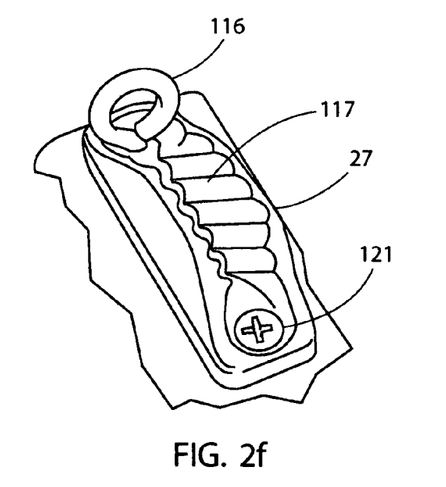
FIG. 2f is a perspective view of the cleat used as rope retaining device when the Logging Device is used as a winch.
Figure 2G:
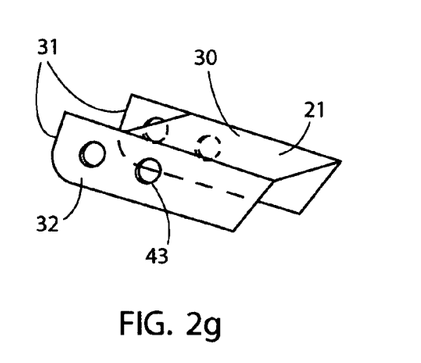
FIG. 2g is a perspective view of the support member.

Referring now to FIG. 2f, the cleat 27 is shown. The cleat has the guide ring 116 mounted at one end of the cleat 27. The cleat 27 has raised sides 117 so that a rope 119 threaded through the cleat 27 is retained against backward movement by the raised sides 117 the rope is thereby prevented from slipping back through a ring guide 116.

A screw 121 affixes the cleat 27 to the body 11 at one end and the ring guide 116 secures the cleat 27 at the opposite end of the body 11. The rope 119 enters the cleat 27 where the ring guide 116 is located.

Figure 5:
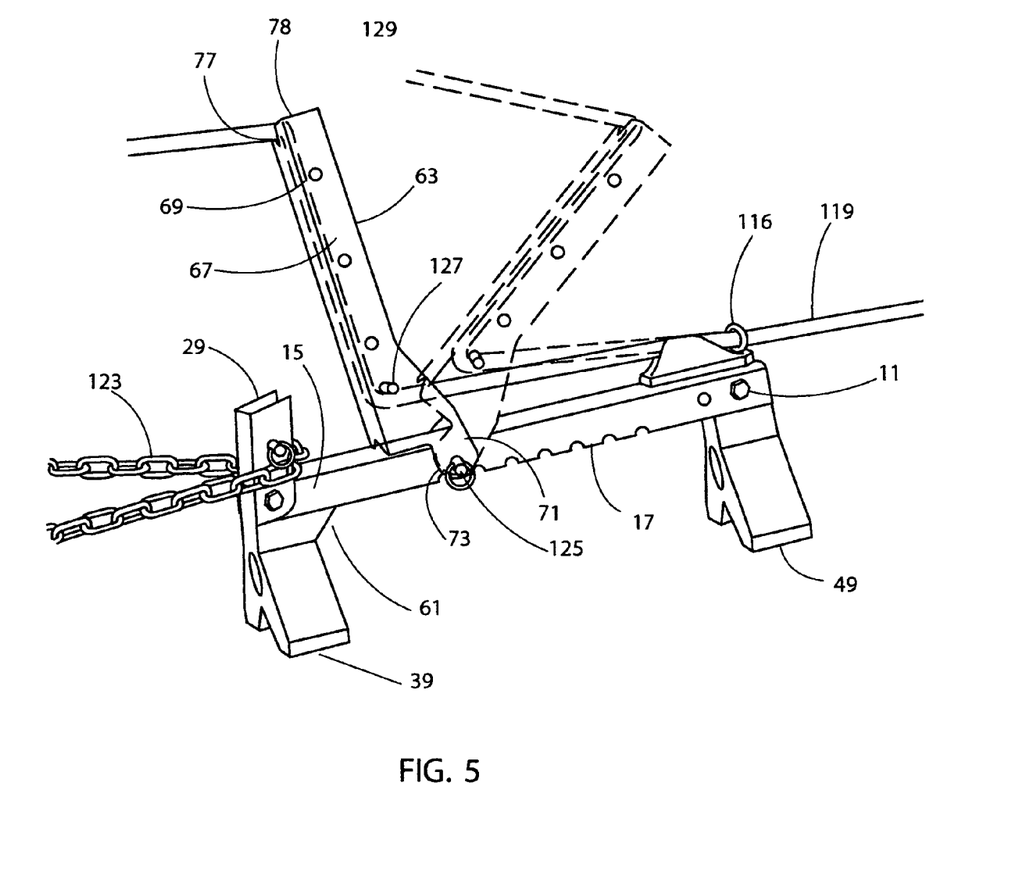
FIG. 5 is a perspective view of the Logging Device used as a winch.

Referring now to FIG. 5, the Logging Device is shown assembled for use as a log puller or winch. In this configuration, the body 11 is mounted on the two feet 45 at the cleat end 13 and the support end 15 of the body 11. The pin 41 in the support member 29 is placed through a link in a chain 123 to assure that the chain 123 will not slide off the support member 29. The chain 123 is wrapped around an external supporting body such as a tree (not shown) and another link of the chain 123 is secured by the pin 41, thus causing the chain 123 to form a loop around the external supporting body. Any manner of securing the chain 123 is acceptable.

Generally, in the cent section 17 of the body 11, between the cleat end 13 and the support end 15, the arm 63 is attached to the body 11 with a pin 125 being inserted throught the openings 76 in the arm flanges 71 and through a pair of body openings 28 in the two side surfaces 21. Of the body 11. A fulcrum pin 127 is inserted through the pair of openings 69 in the arm 63 that are located closest to the body 11. The fulcrum pin 127, as it's name implies, serves as a fulcrum for the rope 119.

The rope 119 is tied or otherwise attached to an end of a log or other object (not shown) to be pulled. The other end of the rope 119 is then threaded through the ring guide 116 through the cleat 27. Then, the rope 49 is then fed behind the fulcrum pin 127 and along the arm 63 to the notch end 78 of the arm 63. The rope 119 is placed into the V-notch 77 which holds the rope 119.

The arm 63, which can rotate on the body 11, is then cranked alternately toward and away from the body 11 in a repeated back-and-forth motion. The cranking motion draws the rope 119 through the ring guide 116. As a result, a log or other object can be winched to a desired location.

Figure 3A:
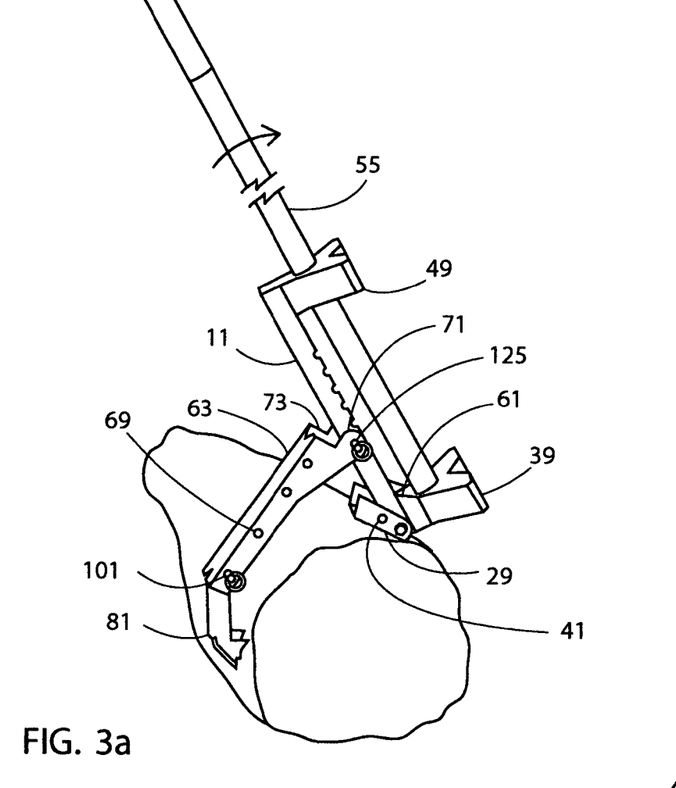
FIG. 3a is a perspective view of the Logging Device mounted on a log in the initial position to roll a log.
Figure 3B:
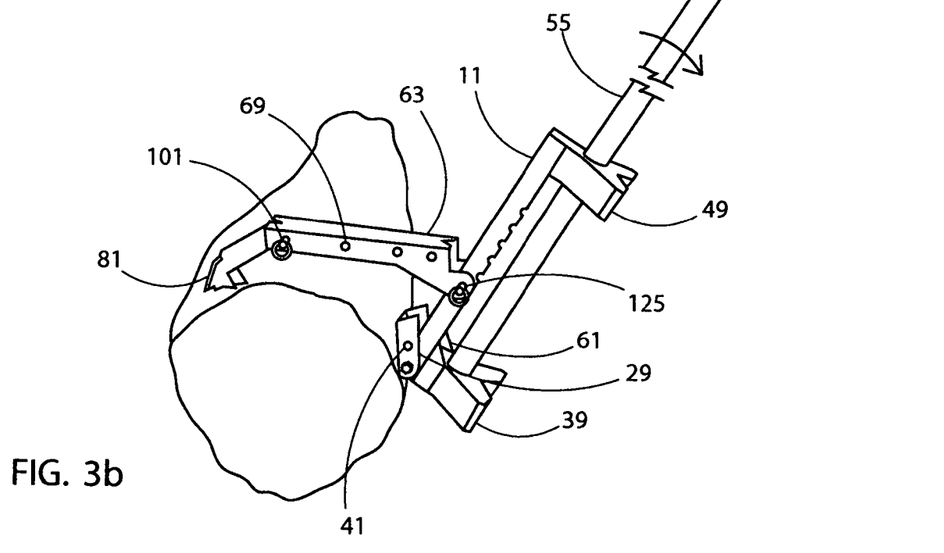
FIG. 3b is a perspective view showing the Logging Device mounted on a log in the initial position to roll a log.
Figure 4A:
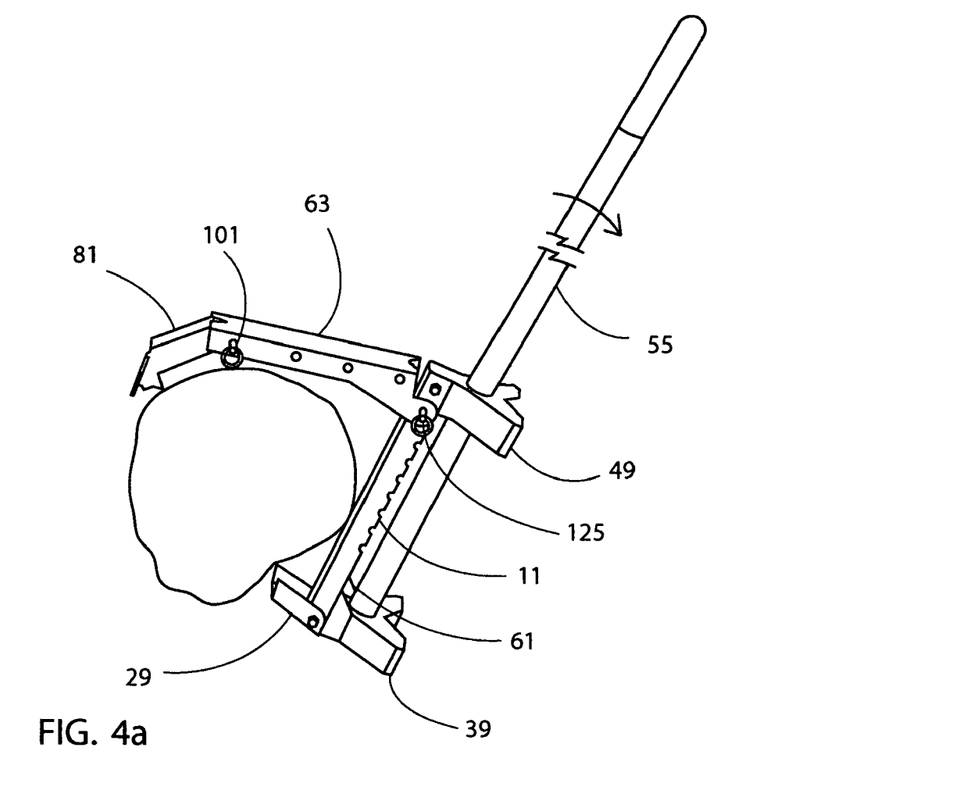
FIG. 4a is a perspective view of the Logging Device in the same configuration as shown in FIG. 3a and 3b but in the initial position to lift a log.
Figure 4B:
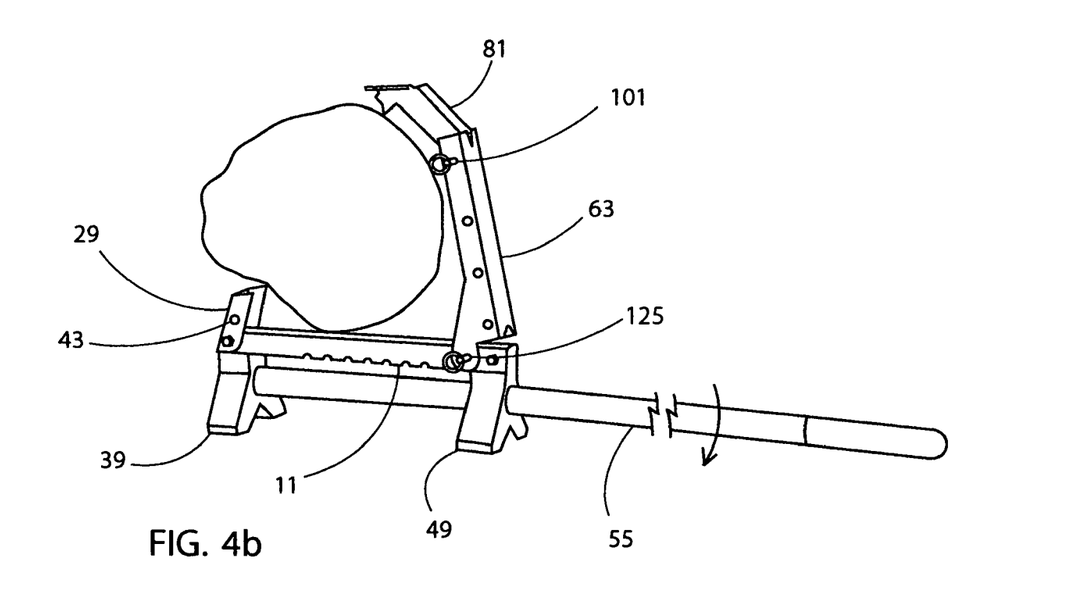
FIG. 4b is a perspective view similar to FIG. 4a but after the log has been lifted onto the body of the Logging Device.

Referring to FIG. 3a and FIG. 3b, the Logging Device is shown being used as a log roller. In this configuration, the body 11 and the two feet 45 and claw 81 are used with the arm 63 mounted on the body 11 by using the body openings 28 located toward the support end 15. The claw 81 is mounted on the arm 63 at the notch end 78 of the arm 63. The claw 81 grips the log to be rolled. The handle 55 is inserted through the cleat foot opening 53 in the cleat foot 49 and lodged in the support foot opening 57 in the support foot 39. The handle 55 is then secured by the push pin 115 being held by the cleat foot 49 and kept from rotating by the cut outs 113 being seated on the raised bar 59 in the support foot arm opening 57 in the support foot 39. The arm 63 is affixed to the body 11 with the pin 115 inserted through the openings 76 in the arm flanges 71 and a pair of body openings 28 in the side surfaces 21 of the body 11. The claw 81 is attached to the notch end 78 of the arm 63 by inserting the pin 101 through the claw openings 99 in the claw flanges 97 and a pair of arm openings 69 in the two side elements 67 of the arm 63 adjacent the notch end 78. The two sets of teeth 83 grip a log and the claw 81 can be placed at only one of the three locations of the plurality of openings 69 in the two side elements 67 on the arm 63 depending upon the size of the log. The pin 41 in the support member 29 is essential to retain the support member 29 at the correct angle for rolling a log. Also, when lifting, the claw is always located at the notch end 78 of the arm 63.

When used as a log lifter, support member 29 on the body 11 is forced as far as possible under the log to be lifted. The claw pin 81 is placed down on the log and the handle 55 is pulled away from the log. The arrangement of the Logging Device (FIGS. 4a and 4b) when used as a log lifter is generally the same as when the Logging Device is used to roll a log except that the pin 41 is not required when lifting. Also, the placement of the Logging Device on a log is different. In a log lifting application it is essential that the support member 29 be placed as far as possible under the log to be lifted. The handle 55 is used to press the body 11 as closely as possible against the log. The claw 81 attached to the arm 63 engages the log over the top of the log away from the body 11 of the Logging Device. Then, by pulling the handle 55 away from the log, the log is rolled over the support member 29 and the log rests on the body 11 supported by the two feet 45.

Figure 6:
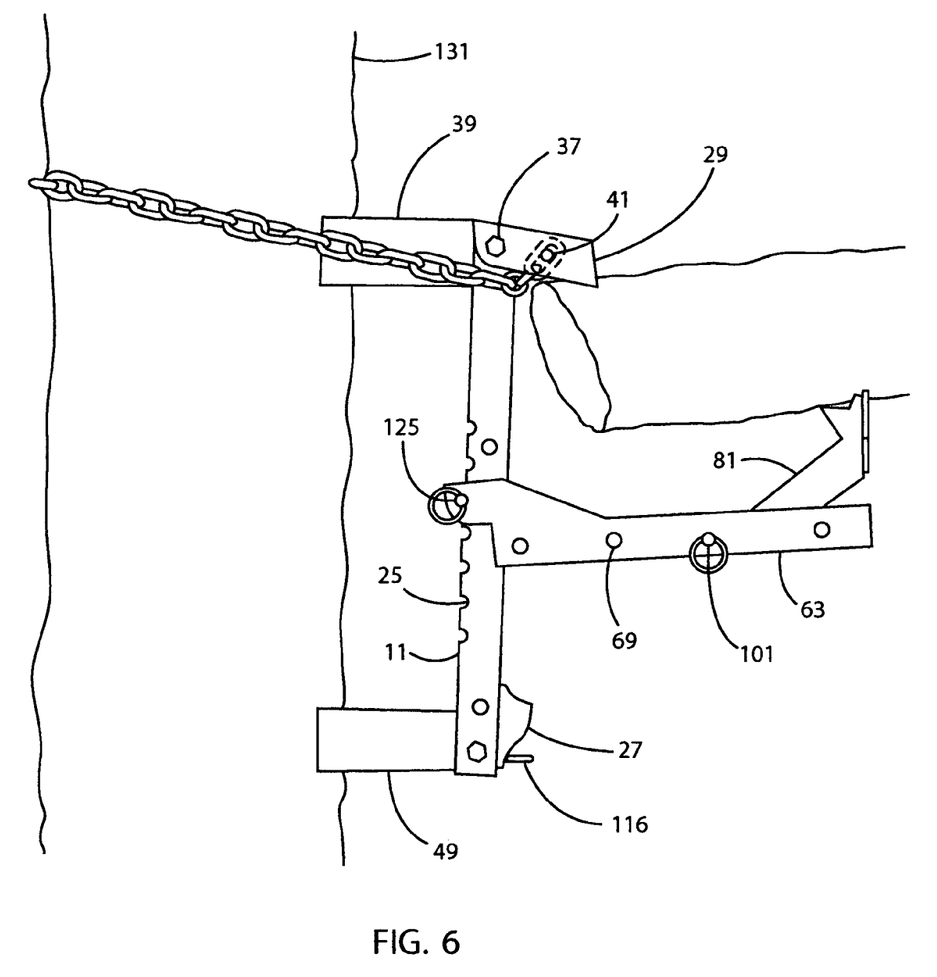
FIG. 6 is a side elevation of the Logging Device mounted vertically on a tree and held by a chain showing the Logging Device being used for holding a log.

Referring to FIG. 6, the Logging Device is shown assembled to hold a log with the support member 29 mounted on the body 11. The body 11 with two feet 45 secured at both ends 13, 15 and with the support member 29 secured with a chain 123, or other securing means, such as a rope, cable or strap, to external support such as a tree trunk 131. As a result, the Logging Device is vertically oriented parallel to the tree trunk 131. The tree trunk 131 is shown in FIG. 6 but other supports of a suitable strength can be used to hold the Logging Device in a vertical position as required when the Logging Device is used for holding a log. The arm 63 is affixed to the body 11 using the arm flanges 69 to secure the arm 63 to the body 11 at a pair of notches 25 and by using the pin 25.

The claw 81 is attached to the arm 63 generally at the middle of the arm 63 by placing pin 101 through the claw opening 99 and the elements arm openings 69. Since the arm 63 is located below the support member 29, the claw 81 generally points upwardly from the arm 63 toward the support member 29. The pin 125 is placed through the arm flange openings 76 and a pair of notches 25. The end of a log rests on the arm 63, generally perpendicular to the body 11 and the tree trunk 131. The support member 29 presses down on the end of the log closer to the body 11 than the claw 81 thereby locking the log in a cantilevered position in the Logging Device. The log can then be processed, as desired, most usually by being sawed into logs of a shorter length.

While a preferred embodiment is shown and described herein, it should be understood that the present disclosure is made by way of example only and that variations in the described device and its uses are possible within the scope of this disclosure without departing from the subject matter coming within the scope of the following claims, and a reasonable equivalency thereof, which claims are regarded as the invention.

The invention claimed is:

1. A Logging Device for performing multiple logging functions, the Logging Device comprising:
   a body having a cleat end and a support end, and a support member being secured to the body at the support end, the body having a top surface and two side surfaces, the two side surfaces being generally parallel with one another and having lower edges, the two side surfaces having notches along the lower edges, the notches being located between the cleat end and the support end and toward the cleat end;
   a cleat foot mounted on the body at the cleat end and a support foot mounted on the body at the support end, both the cleat foot and the support foot being mounted on the same side of the body which is the opposite side from the support member, the cleat foot having a cleat foot opening and the support foot having a support foot opening;
   a handle for engaging the cleat foot opening and the support foot opening;
   an arm movably mounted on the body on the side opposite from the cleat foot and the support foot, and the arm is releasably engageable with the notches; and
   a claw mounted on the arm remote from the body.

2. A Logging Device according to claim 1 including means to retain the handle in the support foot and in the cleat foot.

3. A Logging Device according to claim 1 including means to prevent rotation of the handle in the support foot.

4. A Logging Device according to claim 1 including:
   means to retain the handle in the support foot and in the cleat foot; and
   means to prevent rotation of the handle in the support foot.

5. A Logging Device according to claim 1 further including a cleat and a ring guide secured to the top surface of the body at the cleat end of the body.

6. A Logging Device according to claim 1 wherein the support member has a top member and two side members and a support flange end, the two side members being generally parallel to one another, the two side members extending beyond the top member at the support flange end to form support flanges.

7. A Logging Device according to claim 1 wherein the cleat foot opening and the support foot opening have substantially the same size and configuration and are aligned with one another, the support foot opening in the support foot having a bottom surface, the bottom surface having a raised bar dramatically across the bottom surface.

8. A Logging Device according to claim 1 wherein the arm has two side elements and a top element and an arm flange end and a notch end and has a V-notch at the notch end located generally midway between the two side elements and wherein a pair of arm flanges extend from the side elements beyond the top element at the arm flange end, the arm flanges being mounted on the side surfaces of the body and further including means to secure the arm to the body.

9. A Logging Device for performing multiple logging functions, the Logging Device comprising:
   a body having a cleat end and support end and a top surface and two side surfaces, the two side surfaces being generally parallel with one another and having lower edges, the two side surfaces having notches along the lower edges, the notches being located between the cleat end and the support end and toward the cleat end;
   a cleat secured to the top surface of the body at the cleat end of the body;
   a support member having a top member and two side members, the two side members being generally parallel to one another, the two side members extending beyond the top member at the support flange end to form support flanges;
   a cleat foot and a support foot mounted on the body and secured to the side surfaces, the cleat foot being mounted at the cleat end of the body and the support foot being mounted at the support end of the body; the cleat foot having a cleat foot opening through it and the support foot having a support foot opening partially into it having the same size and configuration as the cleat foot opening and being aligned with the cleat foot opening;
   an arm movably mounted on the body, the arm having an arm flange end and a notch end and having a top element and two side elements, the side elements having a plurality of openings, and the arm is releasably engageable with the notches;
   a claw mounted on the notch end of the arm, the claw having a grip end and a claw flange end, the claw further including two sets of teeth mounted at the grip end and having two claw flanges extending from the claw flange end, the two claw flanges being secured to the notch end of the arm; and
   a handle for insertion into the cleat foot opening and the support foot opening.

10. A Logging Device according to claim 9 including means to retain the handle in the support foot opening and in the cleat foot.

11. A Logging Device according to claim 9 including means to prevent rotation of the handle in the support foot and the cleat foot.

12. A Logging Device according to claim 9 including;
   means to retain the handle in the support foot opening and in the cleat foot opening; and
   means to prevent rotation of the handle in the support foot opening and the cleat foot opening.

13. A Logging Device for performing multiple logging functions, the Logging Device comprising:
   a body having a cleat end and support end and a top surface and two side surfaces, the two side surfaces being generally parallel with one another and having lower edges, the two side surfaces having notches along the lower edges, the notches being located between the cleat end and the support end and toward the cleat end;

a cleat secured to the top surface of the body at the cleat end of the body;

a cleat and a ring guide being secured to the top surface of the body at the cleat end of the body;

a support member having a top member and two side members, the two side members being generally parallel to one another, the two side members extending beyond the top member at the support flange end to form support flanges, the support member being mounted at the support end of the body by the support flanges being secured to the side surfaces of the body;

a cleat foot and a support foot mounted on the body opposite from the support member and being secured to the side surfaces of the body, the cleat foot being mounted at the cleat end of the body and foot having a cleat foot opening through it and the support foot having a support foot opening partially into it and having the same size and configuration as the cleat foot opening and being aligned with the cleat foot opening, the support foot opening in the support foot having a bottom surface, the bottom surface having a raised bar diametrically across the bottom surface;

an arm movably mounted on the body, the arm having an arm flange end and a notch end and having a top element and two side elements, the side elements having a plurality of arm element openings, and the arm is releasably engageable with the notches;

a claw mounted on the notch end of the arm, the claw having a grip end and a claw flange end, the claw further including teeth mounted at the grip end and having two claw flanges extending from the claw flange end, the two claw flanges being secured to the notch end of the arm; and a handle having a circular cross section and having a hand end and a lock end, the lock end having a cut out, the handle having a push pin between the hand end and the lock end, the handle being adapted to fit in the support foot opening and the cleat foot opening, the cut out in lock end of the end of the handle engaging the raised bar in the bottom of the support foot opening to prevent rotation of the handle and the push pin engaging the cleat foot to prevent the handle from being withdrawn.

* * * * *